(12) United States Patent
Micke et al.

(10) Patent No.: US 8,604,415 B2
(45) Date of Patent: Dec. 10, 2013

(54) RADIATION DOSIMETRY METHOD

(75) Inventors: Andre Micke, Summit, NJ (US); David F. Lewis, Monroe, CT (US); Xiang Yu, Bridgewater, NJ (US)

(73) Assignee: ISP Investments Inc., Wilmington, DE (US)

( * ) Notice: Subject to any disclaimer, the term of this patent is extended or adjusted under 35 U.S.C. 154(b) by 0 days.

(21) Appl. No.: 13/640,122

(22) PCT Filed: Mar. 22, 2011

(86) PCT No.: PCT/US2011/029363
§ 371 (c)(1),
(2), (4) Date: Dec. 17, 2012

(87) PCT Pub. No.: WO2011/126725
PCT Pub. Date: Oct. 13, 2011

(65) Prior Publication Data
US 2013/0193316 A1    Aug. 1, 2013

Related U.S. Application Data

(60) Provisional application No. 61/322,632, filed on Apr. 9, 2010.

(51) Int. Cl.
*G01T 1/02* (2006.01)
*G12B 13/00* (2006.01)

(52) U.S. Cl.
USPC .................................. 250/252.1; 250/484.5

(58) Field of Classification Search
USPC ........... 250/252.1, 473.1, 474.1, 484.4, 484.5
See application file for complete search history.

(56) References Cited

U.S. PATENT DOCUMENTS

| | | |
|---|---|---|
| 6,285,031 B1 | 9/2001 | Listl et al. |
| 2006/0145091 A1 | 7/2006 | Patel |
| 2006/0159324 A1 | 7/2006 | Ritt et al. |
| 2007/0019790 A1 | 1/2007 | Lewis et al. |
| 2008/0089603 A1 | 4/2008 | Lewis et al. |

*Primary Examiner* — Mark R Gaworecki
(74) *Attorney, Agent, or Firm* — Thompson Hine LLP; William J. Davis

(57) ABSTRACT

A radiation dosimetry method and associated devices for carrying out the method are disclosed herein. More particularly, a method and associated apparatus which compensates for variations in amounts of a radiation sensitive material in a radiation dosimetry film is provided.

18 Claims, 7 Drawing Sheets

Image of Film after Radiation Exposure and Dose Map Calculated from Response in the Red Color Channel.

Dose-independent and Dose-Dependent Portions of a Measured Image
Using the Triple Channel Correction Method Profile Across the Dose-Independent Image Portion Derived Using the Triple Channel Correction Method.

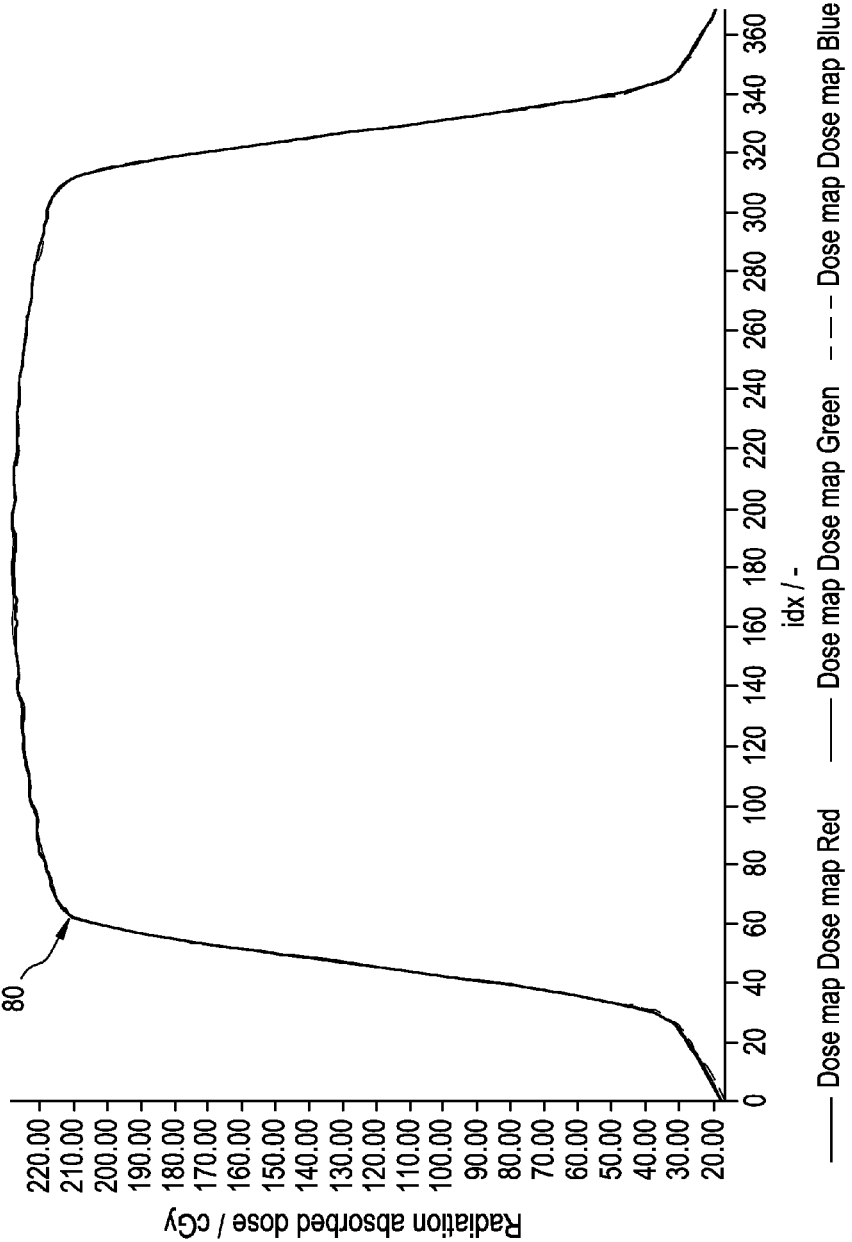

RADIATION DOSIMETRY METHOD

FIELD

This present application relates to a radiation dosimetry method and associated devices for carrying out the method. More particularly, this invention relates to such a method and associated apparatus which compensates for variations in amounts of a radiation sensitive material in a radiation dosimetry film.

BACKGROUND

In facilities where radiation emitting sources are used, for example, in hospitals where cancer patients receive radiation treatments or in blood banks where blood products are irradiated, various methods are used to quantitatively determine the radiation dose delivered by the source. The methods practiced include the use of thermoluminescent dosimeters (TLD's), ionization-type radiation detectors, photographic film, and radiochromic materials. TLD's are inconvenient because they require a complicated and time-consuming read-out process. Ionization-type radiation detectors are awkward and unwieldy and require a complicated setup. Photographic film requires a time-consuming chemical processing procedure before read-out. Radiochromic materials are preferred because they do not require any post-exposure processing and they are capable of measuring radiation doses with a high spatial resolution, but they are inconvenient in current practice because the calculation of the dose requires a complex sequence of steps, subject to error.

U.S. Pat. No. 5,637,876 describes a radiation dosimeter, exemplarily for use in determining a level of radiation to which a patient is subjected during radiation treatment, which comprises a substrate provided with a layer of radiation sensitive material. The radiation sensitive material has an optical density which varies systematically in accordance with the degree of radiation exposure. The dosimeter may take the form of a card or a flexible substrate which is positionable on the patient or other irradiation subject and which is also positionable in, or slidable through a slot in, a dose reader which includes a reflection or transmission densitometer.

The radiation sensitive material of a radiation dosimeter may be comprised of micro-crystalline pentacosadiynoic acid (PCDA) dispersed in a polymer matrix. Subjecting monomeric PCDA crystals, or related compounds such at the metal salts of PCDA, to ionizing radiation results in progressive polymerization, the degree of polymerization increasing with radiation dose. The amount of polymerization (and hence, the radiation dose) can be determined by measuring either the optical density or the spectral absorption of the exposed dosimeter. However, it has been found that these parameters also vary with both the temperature of the device when measured as well as the thickness of PCDA dispersion and the moisture content of the polymer matrix. Maximum accuracy of dose measurement must account for the temperature and thickness and moisture effects.

Radiation dosimetry film provides a means for measuring radiation exposure at a point, but its principal utility is in obtaining a two-dimensional map of radiation exposure, i.e. radiation exposure at multiple points in a two-dimensional array. A typical user may measure an 8"×10" size film in one, or more, color channels at a spatial resolution of 75 dpi, generating a map of radiation doses at 450,000 points. Of course, other resolutions can be used to generate the radiation exposure map.

In practice, there is a problem presented by the measurement of the radiation sensitive film at a multiplicity of points. The problem is the availability and cost of means to make the measurements. Measurements of optical absorbance of the active component of a film (e.g. PCDA or the lithium salt of PCDA, LiPCDA) at the primary absorbance peak and other components at predetermined wavelengths would require the use of a scanning spectrophotometer. Such equipment is not readily available and would be of high cost. Furthermore the speed of operation would be slow because of the low intensity of the light source at the specific wavelengths where measurement is required.

A possible solution to the problem is to employ a film or document scanner to collect measurements of the film. The advantage of such means is that these scanners are widely available, they are of relatively low cost (often <$1000), they scan at high spatial resolution (up to 2400 dpi), they are rapid in operation (8"×10" scan at 75 dpi resolution in <30 seconds), and they are adapted to measure color.

A film scanner is not like a spectrophotometer. It does not measure absorbance at specific wavelengths, but rather measures over a band of wavelengths. The band of wavelengths over which a specific model of scanner operates is defined by a combination of factors including the spectral output of a light source, the spectral absorbance of optical filters in the light path and the spectral response of the detector. A scanner adapted for color measurement typically will assess light absorbance integrated over three bands of wavelengths defining red, green and blue portions of the visible spectrum. The contribution of light absorbance at each wavelength to the total signal within a color band varies wavelength by wavelength. The weight at each wavelength is not user-defined, but rather depends on the aforesaid factors of spectral output of a light source, the spectral absorbance of optical filters in the light path and the spectral response of the detector.

SUMMARY

A radiation dosimetry method and associated devices for carrying out the method are disclosed herein. More particularly, methods and associated apparatus which compensate for variations in amounts of a radiation sensitive material in a radiation dosimetry film are provided.

A radiation dosimetry film is disclosed containing a radiation impervious material in proportion to the radiation sensitive material and by means of which compensation for variations in amounts of the radiation sensitive material in the radiation dosimetry film may be made.

The available polyacetylenic radiation-sensitive components produce a colored polymer upon exposure to radiation. The polymer so produced exhibits absorption in all three bands of the visible spectrum over which commercially available, low-cost film scanners operate. The absorbance is relatively high in at least one color band and relatively low in at least one color band. While it is possible in practice to choose a radiation impervious material that has essentially no absorbance in at least one color measurement band, the thickness correction must account for the fact that the received signal has a contribution from the radiation impervious material as well as the colored component resulting from radiation exposure of the active component.

In accordance with one aspect, a radiation dosimetry method includes the following steps:

(a) providing a radiation dosimetry calibration film comprising a substrate and a layer of radiation-sensitive material disposed on the substrate wherein the radiation-sensitive material comprises a radiation-sensitive active component and a radiation-impervious material;

(b) exposing discrete areas of the radiation dosimetry calibration film to known doses of radiation;

(c) scanning the exposed radiation dosimetry calibration film in a plurality of color response channels to generate a digital image, $I_C$; with responses in a plurality of component color channels;

(d) measuring the digital image Ic to determine the scanner response values of the exposed areas in each component color channel;

(e) determining dosimetry film calibration curves for each component color channel by plotting the scanner response values in each component color channel versus the corresponding dose values and fitting the data to a mathematical function expressing the dose values as a function of the scanner response values;

(f) providing a radiation dosimetry measurement film comprising a substrate and a layer of radiation-sensitive material disposed on said substrate wherein said radiation-sensitive material comprises a radiation-sensitive active component and a radiation-impervious material; scanning the radiation dosimetry measurement film in a plurality of color response channels, said measurement film comprised of areas exposed to a pattern of radiation dose to generate a digital image, $I_M$; with responses in a plurality of component color channels;

(g) applying said dosimetry film calibration curves to divide the responses at each location and each component color channel comprising the digital image of the measurement film into a dose dependent portion comprising a plurality of dose dependent values that are dependent on radiation dose and a dose independent portion comprising a plurality of dose independent values that are independent of radiation dose using a plurality of calibration curves so that the differences between the radiation dose values in the component color channels are minimized;

(h) using said dose dependent values and said dose independent values to generate a dose map and relative thickness map of said radiation dosimetry measurement film;

(i) using said dose dependent values and said dose independent values to generate a map of the signal noise contained in said dose map of said radiation dosimetry measurement film;

(j) determining a correction function to remove said signal noise from said dose map of the radiation dosimetry measurement film; and (k) applying said correction function to provide a corrected dose map which accounts for variations in thickness of the layer of radiation sensitive material.

(l) providing a radiation dosimetry measurement film comprising a substrate and a layer of radiation-sensitive material disposed on the substrate wherein the radiation-sensitive material comprises a radiation-sensitive active component and a radiation-impervious material;

(m) scanning the radiation dosimetry measurement film in a plurality of color response channels, the measurement film comprised of areas exposed to a pattern of radiation dose to generate a digital image, $I_M$; with responses in a plurality of component color channels;

(n) dividing the responses at each location and each component color channel comprising the digital image of the measurement film into a dose dependent portion comprising a plurality of dose dependent values that are dependent on radiation dose and a dose independent portion comprising a plurality of dose independent values that are independent of radiation dose using a plurality of calibration curves so that the differences between the radiation dose values in the component color channels are minimized;

(o) using the dose dependent values and the dose independent values to generate a dose map and relative thickness map of the radiation dosimetry measurement film;

(p) using the dose dependent values and the dose independent values to generate a map of the signal noise contained in the dose map of the radiation dosimetry measurement film;

(q) determining a correction function to remove the signal noise from the dose map of the radiation dosimetry measurement film; and (r) applying the correction function to provide a corrected dose map which accounts for variations in thickness of the layer of radiation sensitive material.

In accordance with certain embodiments the radiation dosimetry film comprises a substrate and a layer of radiation-sensitive material disposed on the substrate wherein the radiation-sensitive material comprises a radiation-sensitive active component and a radiation-impervious material.

In accordance with another aspect, a radiation dosimetry method includes the following steps:

(a) scanning a radiation dosimetry measurement film which has been exposed to a dose of radiation to generate a digital image, $I_M$, wherein the radiation dosimetry measurement film includes a substrate and a layer of radiation-sensitive material disposed on the substrate and wherein the layer of radiation-sensitive material includes a radiation-sensitive active component and a radiation-impervious material. Exposure of the radiation-sensitive active component produces a colored compound that exhibits an absorbance dependent on dose in at least one component channel of a scanner and the radiation-impervious material exhibits an absorbance substantially independent of dose in at least one component channel of the seamier; and (b) adjusting the digital image by accounting for variations in thickness of the radiation sensitive material layer to produce a corrected image.

BRIEF DESCRIPTION OF THE DRAWINGS

FIG. 7 is a graph depicting dose profiles before and after correction using the triple channel method.

DETAILED DESCRIPTION

Figure 1:
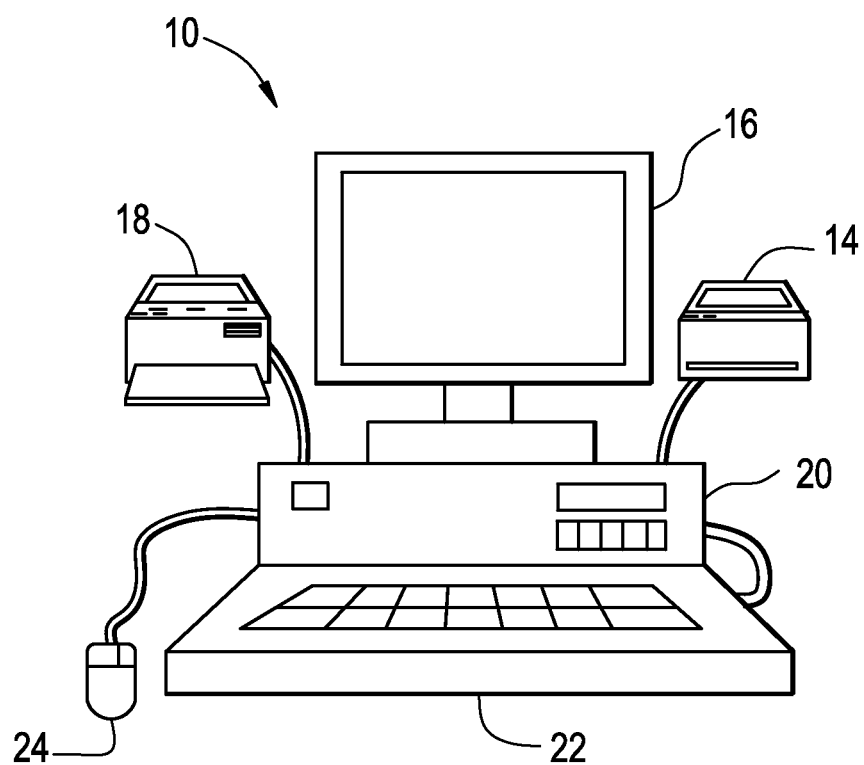
FIG. 1 is a diagram illustrating a computer system and scanner useful in accordance with certain embodiments of the present invention.

In accordance with one aspect of the present invention, a radiation dosimetry method is described that facilitates determination of dose response in a manner that accounts for variations in thickness of the radiation sensitive material. In accordance with particular embodiments, the dose response may be calculated using at least two component channels, more particularly using two color channels of a flatbed color scanner. The method then allows for the measured response to be split into two portions, one of which is dose-dependent and the other dose-independent. The dose independent portion contains values proportional to the thickness of the radiation sensitive layer. This portion can be used to correct the dose response derived from the radiation-sensitive active component to account for variations caused by differences in the thickness of the active component.

The term "image" as used herein refers to the digital data corresponding to a scanned sample. The digital data may be the raw values directly obtained from the scanner or calculated values based on the raw values, such as optical density or absorbance values.

The term "radiation-impervious material" refers to a material in the radiation sensitive layer that provides a baseline measure of the thickness of a radiation sensitive layer. In accordance with certain aspects, the material may be a marker dye that exhibits peak absorbance in a color channel different than the color channel in which the radiation-sensitive active component exhibits a peak absorbance. In a typical case the radiation sensitive layer will be comprised of a radiation-sensitive component and a radiation-impervious material contained within a matrix of binder material. Additionally the radiation sensitive layer may contain other addenda such as preservatives, antioxidants and humectants. The radiation-impervious material or marker dye typically will be soluble or dispersible in the binder matrix of the radiation sensitive material. Although not required, the marker dye material and other components of the radiation sensitive layer except the radiation-sensitive component may exhibit no significant response to radiation exposure, i.e., the spectral response of the material may exhibit no significant change in optical absorbance when exposed to radiation doses of less than 50Gy and in some cases less than 100000Gy. In accordance with certain embodiments, the material may be present in the radiation sensitive material in amounts ranging from about 0.001 to about 10% by weight, more particularly from about 0.01 to about 1% by weight, and in certain cases from about 0.1 to about 0.5% by weight. In accordance with other aspects, the radiation-impervious material may be a part of the radiation sensitive layer or even a component part of the radiation sensitive active molecule or the binder material or any of the addenda in the radiation sensitive layer. In accordance with this aspect, the absorbance signal of the component part is independent of dose. The radiation-impervious material may be present in an amount sufficient to provide an absorbance between about 0.2 and 2.0, more particularly between about 0.5 and 1.0 in at least one component channel.

Marker dyes can be used as radiation-impervious materials capable of providing an absorbance signal in proportion to the thickness of the radiation sensitive layer. Examples of useful marker dyes include, but are not limited to, tartrazine, eosin, quinoline yellow, metanil yellow. In accordance with certain aspects, the marker dyes may exhibit a peak absorbance in the blue portion of the visible spectrtun with very little or no absorbance in the red part of the spectrum. Accordingly, these dyes are typically yellow in color. Tartrazine dye is particularly useful.

The radiation sensitive material layer may contain more than one radiation-impervious material or marker dye that can be used to determine thickness variations in the radiation sensitive layer. The radiation-impervious materials or marker dyes could produce signals in a plurality of color channels so long as the signal is independent of dose.

In at least one color or component channel, at least some part of the absorbance is due to the radiation-sensitive active component and the part of the absorbance due to the active component should be proportional to the radiation dose.

In accordance with one aspect of the present invention, a radiation dosimetry method is disclosed. The method includes scanning a radiation dosimetry measurement film in a plurality of color response channels, the measurement film comprised of areas exposed to a pattern of radiation dose to generate a digital image, $I_M$, with responses in a plurality of component color channels The radiation dosimetry measurement film includes a substrate and a layer of radiation-sensitive material disposed on the substrate wherein the radiation-sensitive material comprises a radiation-sensitive active component and a radiation-impervious material. The responses at each location and each component color channel comprising the digital image of the measurement film are divided into a dose dependent portion comprising a plurality of dose dependent values that are dependent on radiation dose and a dose independent portion comprising a plurality of dose independent values that are independent of radiation dose using a plurality of calibration curves so that the differences between the radiation dose values in the component color channels are minimized. The dose dependent values and the dose independent values are used to generate a dose map and relative thickness map of the radiation dosimetry measurement film. The dose dependent values and the dose independent values are also used to generate a map of the signal noise contained in the dose map of the radiation dosimetry measurement film. A correction function is developed to remove the signal noise from the dose map of the radiation dosimetry measurement film and then the correction function is applied to the dose map to provide a corrected dose map which accounts for variations in thickness of the layer of radiation sensitive material.

In accordance with certain embodiments the radiation dosimetry film comprises a substrate and a layer of radiation-sensitive material disposed on the substrate wherein the radiation-sensitive material comprises a radiation-sensitive active component and a radiation-impervious material.

In accordance with another aspect, a radiation dosimetry method is disclosed which includes scanning a radiation dosimetry measurement film which has been exposed to a dose of radiation to generate a digital image, $I_M$. Exposure of the radiation-sensitive active component produces a colored compound that exhibits an absorbance dependent on dose in at least one component channel of a scanner while the radiation-impervious material exhibits an absorbance independent of dose in at least one component channel of the scanner. The digital image is adjusted to produce a corrected image wherein the corrected image accounts for variations in thickness of the radiation-sensitive layer.

In accordance with another aspect of the present invention, a method for measuring the response of a radiation dosimetry film is provided which also includes the steps involved in determining calibration curves relating dose to color response. In one embodiment the method involves scanning one or more radiation dosimetry calibration films in a plurality of response channels wherein the calibration films include a number of imaged areas corresponding to known radiation dose levels to generate a digital image, $I_C$, with responses in a the plurality of response channels, measuring the digital image to obtain response values in each of the response channels, and determining a plurality of calibration curves for response values in each of the response channels as a function of dose.

The term "radiochromic film" as used herein generally refers to film that changes color and produces a visible image when exposed to ionizing radiation, but experiences insignificant change from exposure to visible light or other forms of non-ionizing radiation.

The term "ionizing radiation" as used herein generally refers to radiation with a level of energy that is high enough to cause atoms to lose electrons and become charged or ionized. Ionizing radiation may be in the form of a high energy particles, like an alpha or beta particles, or in the form of electromagnetic waves, like gamma rays or x-rays. High energy particles and electromagnetic waves are released from the nuclei of radioactive atoms that are decaying or may be created by causing accelerated electrons to strike a metal target.

The term "scanner" as used herein is generally employed to refer to a device that can be used to optically scan a multidimensional film and output a multidimensional image relating the optical transmittance or reflectance of the film at an array of locations.

The term "flatbed scanner" is used to describe a scanner for scanning film in a two-dimensional plane.

The term "CCD scanner" is used to describe a scanner in which the sensor device is an array of charge coupled elements.

The terms "RGB scanner" and "RGB color scanner" as used herein generally refer to scanners that produce an image composed of response values in color channels comprising the red, green and blue portions of the visible color spectrum.

The term "color channel" as used herein is generally employed to refer to one of the output response bands of an optical color scanner.

The term "component color channel" as used herein is generally used to refer to one of the color channels within an image composed of a multiplicity of color channels.

The terms "response value" and "scanner response value" as used herein generally refer to a measure of the light intensity transmitted or reflected at a location on a film as determined by an optical scanner.

The term "pixel value" as used herein generally refers to the response value for an individual pixel within a digital image.

The term "marker dye" as used herein generally refers to a colored substance impervious to exposure by ionizing radiation that is incorporated in the active layer of a radiation sensitive film to provide a reference response value in at least one color channel proportional to the thickness of the active layer The term "reference channel" as used herein refers to the color channel in which the marker dye provides the greatest response.

The term "triple channel correction" as used herein refers to the correction method in which the responses of three color channels are used to correct the response of a radiation sensitive film for differences in the thickness of the radiation sensitive component.

The present invention comprises both an apparatus 10 and a method for compensating for variations in thickness of a radiation sensitive material in a radiation dosimetry film. An example of an apparatus 10 is shown in FIG. 1. Although the present invention is described herein as it could be used in conjunction with a flatbed scanner 14, the present invention, as will be described in greater detail below, may be used in conjunction with any of a wide range of other optical scanner apparatus.

The apparatus or computer system 10 that performs the method may comprise a flatbed scanner 14. See FIG. 1. The apparatus 10 may further include a monitor 16, a printer 18, a processing unit 20, a keyboard 22, and a mouse 24. The apparatus 10 may be provided with image processing software (not shown) which allows the apparatus 10 to display an image of a scanned radiation dosimetry film on the monitor 16. The computer system 10 may also print an image (not shown) of the radiation dosimetry film on the printer 18. The image processing software may also provide various methods for analyzing and manipulating the data from the image.

Calibration of the scanner may also include background correction i.e., calibration per pixel column (scan direction). In accordance with typical flatbed scanners, the CCD detector includes a linear array of photo-detectors for each color response channel. The linear arrays of detectors are perpendicular to the scan direction. Each element in an array sweeps out and measures response in an area parallel to the scan. In accordance with certain embodiments, the calibration process provides a calibrated dose response for each detector element in the CCD array.

In accordance with one aspect of the present invention, the method 10 generally comprises the following steps. In the first step, the radiation dosimetry film is positioned on a scanning bed of the flatbed scanner 14. The flatbed scanner 14 is actuated to scan the radiation dosimetry film and to produce a digital image data signal representative of the radiation dosimetry film. The image data signal may then be transferred to the processing unit 20 of the computer system 10 so that an image of the scanned radiation dosimetry film may be displayed on the monitor 16 or the data may be manipulated to provide image corrected data.

One significant advantage of certain aspects of the present invention is that it is easy to use since all the user has to do is scan the radiation dosimetry film. Indeed, the present invention can be used with currently available flatbed scanners and computers.

Having briefly described the apparatus 10 and the method according to one embodiment of the present invention, as well as some of their more significant features and advantages, the apparatus 10 and the associated method will now be described in detail. However, before proceeding with the description, it should be noted that although the apparatus 10 and method are shown and described herein as they could be used in conjunction with a flatbed scanner 14, they could also be used in conjunction with any of a wide range of other optical scanner apparatus. For instance, the apparatus 10 or method both could be used in conjunction with a digital camera or other image capture device. Consequently, the present invention should not be regarded as limited to use in conjunction with the flatbed scanner 14 shown and described herein.

With the foregoing considerations in mind, the apparatus 10 and method according to one embodiment of the present invention are both shown and described herein as they could be used in conjunction with a flatbed scanner 14, of the type that is readily commercially available and well-known in the art. However, since flatbed scanners are well-known in the art and could readily be provided by persons having ordinary skill in the art after having become familiar with the teachings of the present invention, the various component parts of the flatbed scanner 14 will not be discussed in further detail herein.

As shown in FIG. 1, the flatbed scanner 14 may be connected to a computer system or apparatus 10 that includes a monitor 16, a printer 18, a processing unit 20, a keyboard 22, and a mouse 24. The computer system 10 may be provided with image processing software (not shown) which allows the computer system 10 to display an image of the scanned film on a suitable display device 16, such as a CRT or LCD display. The computer system 10 may also print an image (not shown) of the scanned film on the printer 18.

The apparatus 10 may comprise a processor or central processing unit (CPU) 20, input devices (e.g., scanner 14, keyboard 22, mouse 24) and output devices (e.g., monitor 16, printer 18). The apparatus 10 may further include a storage device having an operating system, files, applications, databases and an image data processing system stored therein. The operating system, once installed, may manage the various tasks, jobs, data and devices of the computer system 10. The apparatus 10 may further include a memory which the operating system may access in carrying out its functions. Contained within a computer readable storage device such as the storage device or memory may be computer readable program code for performing or carrying out one or more of the various steps of method, which steps were discussed briefly above and are discussed in much greater detail below. The CPU 20 may be linked over a network (e.g., a Wide Area Network (WAN), a Local Area Network (LAN), an Intranet, or the Internet) to a server or pool of servers (not shown).

It is understood that the CPU 20 may comprise any of a wide range of suitable processors, as would be obvious to persons having ordinary skill in the art after having become familiar with the teachings of the present invention. For example, the CPU 20 may comprise a processor, an entire laptop or desktop personal computer (PC), or an application specific integrated circuit (ASIC) specifically manufactured for use with the present invention. Likewise, the storage device and memory can be any suitable computer readable storage device, such as read only memory (ROM), random access memory (RAM), video memory (VRAM), hard disk, floppy diskette, compact disc (CD), DVD, flash drive, memory card, magnetic tape, a combination thereof, etc. Further, the CPU 20 and memory need not be separate units and can be combined, or alternatively, the CPU 20 and memory 54 can be separately housed and linked to one another over a remote network or other suitable connection. In addition, there can be any number of CPUs 20 (i.e., one or more), any number of storage devices (i.e., one or more) and/or any number of memories (i.e., one or more) that are connected or linked via the Internet, Intranet, LAN, WAN, etc. In such a scenario, the storage of computer.readable program code may be distributed over the various storage devices and memories and/or executed in parts by the various CPUs 20. Moreover, any number of suitable peripheral devices (e.g., scanner 14, monitor 16, printer 18, keyboard 22, mouse 24, etc.) may be connected to the CPU 20 either directly or indirectly (e.g., over the network). The CPU 20 can be linked to the network using any suitable connection (e.g., modern, T-1, digital subscriber line (DSL), infrared, etc.).

Within the storage device of apparatus 10 may be an image data processing system that is operatively associated with the flatbed scanner 14. The image data processing system may perform one or more of the various steps comprising the method. More specifically, the image data processing system may process the raw color image data signal (not shown) produced by the flatbed scanner 14 so that an image of the scanned object may be displayed or further processed.

In the embodiment shown and described herein, the image data processing functions occur within the processor 20 of the computer system 10. For example, computer programmable code (e.g., image data processing software) may be provided that carries out the various image data processing functions. The program code may be contained within a computer readable storage device, such as storage device or memory, and be operated on the processor 20. Alternatively, the image data processing system may be built into or reside in the housing of flatbed scanner 14. In other words, the flatbed scanner 14 may include the image data processing system so that the processing of the raw color image data signals produced by the scanning device occurs within the flatbed scanner 14. In an alternative embodiment, a device (not shown) specially designed (e.g., "hard wired") may be provided that is operatively associated with the scanner 14 and apparatus 10. The specially designed device may process the color image data signal. In yet another alternative embodiment, the image data processing functions may be split between the flatbed scanner 14 and the CPU 20 of the computer system 10 with each performing portions of the processing functions. In any event, a suitable arrangement for the image data processing system may be easily arrived at by persons having ordinary skill in the art after considering the requirements for the particular application and after becoming familiar with the teachings of the present invention.

The image data processing system may comprise any of a wide range of image data processing systems that are well-known in the art. Accordingly, the present invention should not be regarded as limited to any particular type of image data processing system. Moreover, since image data processing systems are well-known in the art and the details of image data processing systems themselves are not necessary to understand the present invention, the particular image data processing system utilized in one preferred embodiment of the present invention will not be described in further detail herein.

Regardless of the type of image data processing system that is utilized, if any portion of the image data processing system is built into or resides in the housing of flatbed scanner 14, it is generally desirable to provide the image data processing system with one or more communication ports (not shown) to allow data to be transferred or "downloaded" to the CPU 20. While any of a wide range of well-known communication ports and formats may be utilized, in one preferred embodiment, the image data processing system may be provided with a universal serial bus (USB) port (not shown) and/or an infra red (IR) serial port (also not shown). The USB port and/or IR serial port may be located on the scanner housing at any convenient location.

As discussed briefly above, the various steps disclosed herein need not be performed in the particular order shown. In other words, the arrangement described herein is merely illustrative and not intended to limit the teachings of the present invention.

In the first step, the radiation dosimetry film is positioned on the scanning bed of flatbed scanner 14. Of course, a digital camera or other handheld optical scanner device could also be used in place of the flatbed scanner 14.

Once the radiation dosimetry film (or portion thereof) and the scanning bed are positioned adjacent to one another, the flatbed scanner 14 is actuated to scan the radiation dosimetry film and to produce a digital image comprising a plurality responses in a plurality of component channels, typically a color digital image data signal representative of the scanned film. The color image data signal may then be transferred to the computer system 10 so that an image of the scanned object may be displayed on the monitor 16 or the data may be further processed as described in more detail below.

One of ordinary skill in the art is well aware of the various methods that can be used to automatically expose areas of the radiation dosimetry film to different dose levels. For example, multi-leaf collimators, secondary collimators or fixed-blocks of radiation attenuating material, either alone or in combination, may be used to differentially shield the areas during exposure to ionizing radiation. The differentially shielded portions of the radiation detection medium allow for variations in dose level without altering the ionizing radiation characteristics such as beam intensity, individual exposure duration, etc. In accordance with other aspects of the invention, variations in dose level may be obtained by altering the ionizing radiation characteristics, by changing the rate at which the exposure dose is applied or by changing the time of exposure or by any combination of any of the aforesaid means.

Individual radiation dose levels depend on a number of factors, such as the radiation source, time of exposure, rate of exposure, distance between the source of the radiation and the radiation detection medium, etc. Calibration of the radiation dosimetry film in accordance with the present invention typically involves exposing the radiation detection medium to radiation dose levels that cover the range of the radiation dose levels expected to be encountered during use of the film. For example, typical radiation dose levels may fall within the range of from about 1cGy to about 100000Gy, more particularly from about 1cGy to about 10000cGy, more particularly from about 1cGy to about 200cGy and in accordance with particular aspects of the invention, from about 1cGy to about 100cGy.

One embodiment of the present invention provides a radiation dosimetry method wherein the radiation dosimetry film is similar to a radiochromic film such as GAFCHROMIC® radiochromic films manufactured by International Specialty Products. Specific examples of radiochromic compositions that can be modified for use in the present invention include, but are not limited to, those disclosed in U. S. Patent Application Publication 2003/0129759 to Lewis et al., published Jul. 10, 2003, which is incorporated herein in its entirety.

Although the present invention is not limited to a particular type of radiation sensitive material, the following description relates to an embodiment of the invention based on the use of a particularly useful type of material similar to that used in GAFCHROMIC® radiochromic films. GAFCHROMIC® radiocluomic films are self developing, not significantly sensitive to normal room light, and can be cut to a desired size. Exposure to ionizing radiation causes the radiochromic film to immediately change color, typically becoming darker. The degree of darkening is proportional to exposure and can be quantitatively measured with a densitometer or scanner.

The active component in the GAFCHROMIC® film media is a micro-particulate, radiation sensitive monomer that is dispersed in a polymer matrix and coated onto a polyester film base. When the active monomeric component is exposed to ionizing radiation, a polymerization reaction is initiated, resulting in the production of a dye polymer, Since the polymer is by nature, a dye, the exposure produces coloration within the film. The active ingredient in accordance with particular embodiments comprises a long chain fatty acid belonging to a class of molecules known as diacetylencs. Many members of the diacetylene family are characteristically radiation sensitive only when there is intermolecular order, as, for instance, in a crystalline or micellar state. Suitable acetylenic compounds have the structure $A\text{-}(CH_2)_n\text{—}C\!\!=\!\!C\text{—}C\!\!=\!\!C\text{—}(CH_2)_m\text{—}B$, where n and m are both independently an integer of from about 0 to 20, more particularly from about 6 to 14, and A and B are independently a methyl group, a carboxyl group or metal carboxylate group. When exposed to radiation, active diacetylenes undergo a solid-state polymerization reaction producing a dye polymer referred to as a polydiacetylene. The color and spectral absorbance of polydiacetylene is specific to the particular molecular structure, but preferably the color change is clearly visible on the radiation sensitive film. The color change is frequently cyan blue, purple or magenta.

Specific examples of such polyacetylenes include, but are not limited to, pentacosa-10,12-diynoic acid; 13,15-octacosadiyne and docosa-10,12-diyne-1,22-dioic acid. Of these, pentacosa-10,12-diynoic acid is particularly useful since it provides unusually high sensitivity to ionizing radiation exposure. It is to be understood however, that dispersions of other normally crystalline, color developing polyacetylenes having a conjugated structure can be employed alone or in admixture with the preferred diynes as the image receptive layers of the present invention. Such compounds include the diynes of the above structure wherein the A and/or B moieties, in addition to lower alkyl or carboxyl, can also be hydroxy, amido, lower alkyl substituted amido, an aliphatic or aromatic carboxylate ester group having up to 10 carbon atoms, a mono- or di-valent carboxylate metal salt group, halo, carbamyl, lower alkyl substituted carbamyl or tosyl, as well as the corresponding triyne and tetrayne products of the above polyacetylenes having from about 20 to 60 carbon atoms and a conjugated structure. Examples of these compounds include 10,12-docosadiynediol, the ditoluene-p-sulfonate of 9,11-eicosadiynoic acid, the monoethyl ester of 10,12-docosadiynedioic acid, the lithium, sodium or potassium salt of 10,12-pentacosadiynoic acid, the zinc salt of heneicosa-10,12- diynoic acid, the manganese salt of eicosa-5,7-diynoic acid, 10,12-docosadiyne chloride, 10,12-pentacosadiyne (m-tolyl-urethane), 10,12-pentacosadiyne {[(butoxyl-carbonyl)-methyl]urethanel, N-(dimethyl)-10,12-pentacosadiynamide, N,N'-bis(a 1-methylbenzy-1) 10,12-pentacosadiyndiamide and the like. In addition, the diacetylenes for use in accordance with the invention generally may also have the formula:

wherein R and R' are, for example, both $CH_2\text{—O—}CON\text{—H—}(CH_2)_5CH_3$. Such diacetylenes polymerize in the solid state either upon thermal annealing or exposure to high energy radiation. Suitable compounds are described in U.S. Pat. Nos. 5,420,000, 4,970,137, and 4,734,355, the contents of each of which are incorporated herein by reference. Preferably, the polyacetylenic compound has at least two conjugated acetylenic linkages and contains from about 10 to 60 carbon atoms.

Suitable compounds, which selectively absorb incident low energy photon radiation, are the metal halides and combinations thereof of Group I of the Periodic Table. Particularly useful are Group I metal chlorides, bromides and iodides. These compounds may be added in an amount effective to selectively absorb the incident low energy photon radiation, and generally in an amount of from about 0.1% to 50.0%, and more particularly from about 2.5% to 20% by weight of the dispersion of the coating as described hereinafter.

In accordance with some aspects of the invention, such halides are selected from the group consisting of cesium and rubidium halides and in particular, cesium chloride, cesium bromide, cesium iodide and combinations thereof.

Other suitable compounds include the oxides of elements with atomic number particular bismuth oxide in the form of micro-particles substantially less than 1 micron in size are especially useful.

In addition, it is possible to add an additional compound, which may be a metal ion chelating agent or sequestering agent. The chelating agent can be added in amounts of from about 0.01% to 10.0%, and more particularly from about 0.1% to 2% by weight, based on the weight of the diacetylene compound. Typical chelating agents include disodium ethylenediaminetetraacetate, sodium oxalate, citric acid, sodium citrate, sodium tartrate, sodium polyphosphate, potassium hypophosphate, sodium diethyldithiocarbamate, the sodium salt of N,N,N',N'-ethylenediaminetetra(methylenephosphonic acid), the sodium salt of 1-hydroxyethane-1,1-diphosphonic acid and combinations thereof.

An opacifying agent may also be added to the radiochromic composition. Usually such an agent is a water insoluble metal compound wherein the metal component has an atomic number greater than 18. Examples of suitable compounds include oxides, carbonates, sulfates, sulfites, sulfides, carboxylates, phosphates, phosphates and silicates. An antioxidizing agent may also be added to the composition, usually in an amount of from about 0.01% to 5%, and more particularly from about 0.1 to 1% by weight of the weight of the diacetylene component. Suitable antioxidizing agents include propyl gallate, Tenoxo 6 (Tenox® is a trademark of the Eastman Chemical Company), Tenox® 2, Tenox® 7, Tenox® 20, sodium diethyldithiocarbamate, citric acid, sodium citrate, ascorbic acid, alkali metal sulfides and sulfites, 3-tert-butyl-4-hydroxy-5-methyl- phenyl sulfide, butylated hydroxytoluene, butylated hydroxyanisole, tert-butylhydroquinone, hydroxylamine and hydroxylamine hydrochloride.

The acetylenic component may also be sandwiched between two substrates in which one or both of the substrates may have the capability to filter or absorb light in the UV and/or visible wavelength regions. At least one of the substrates should be transparent in at least part of the visible spectrum.

Particularly useful as substrates are thin, flexible films made from materials such as polyethylene teraphthalate, polyethylene, polypropylene, cellulose acetate and the like.

In accordance with a particular method for preparing a radiochromic film useful herein, the polyacetylenic compound is dispersed in a non-solvating liquid and may be ripened or aged to maximize its radiation sensitivity. This dispersion may also contain a dissolved polymeric binder. Examples of binders include, but are not limited to, gelatin, agar, xanthan gum, polyvinylalcohol and polymers and copolymers containing maleic acid or acrylic acid residues, or salts thereof. The liquid dispersion is then applied onto the surface of a film, e.g., a polyester or similar film, and the coating is then dried. In particular, the normally crystalline or molecularly ordered polyacetylenic compound is dispersed into the non-solvating liquid in a concentration of from about 2 to 50% based on the combined weights of the polyacetylenic compound, the non-solvating liquid and the polymeric binder dissolved therein. The dispersion may then be aged or ripened by either (a) storing the composition at a temperature of from about 0° C. to about 12° C. for a period of from about 1 to 30 days, or (b) freezing the dispersion at a temperature between about -78° C. and about -1° C. for a period of time from about 1 to about 75 hours, or (e) heating the dispersion to a temperature between about 40° C. and about 100° C. for a period of time between about 10 minutes and 24 hours, or (d) a combination of any of the above techniques. This aging or ripening step is to be completed before drying the dispersion on the substrate.

In accordance with the present disclosure, there is a material or combination of materials in the radiation sensitive layer that provides for a dose independent response that can be used to detect variations in thickness of the radiation sensitive layer. In accordance with certain embodiments, the material, such as a marker dye, is added to the dispersion prior to coating on a substrate. The marker dye can be mixed with the dispersion so that it is homogeneous with the radiation-sensitive polyacetylenic compound.

In accordance with one aspect of the present invention, after the aging or ripening of the dispersion, a compound containing an elemental component which selectively increases the absorption of incident low energy photon radiation <200 keV is mixed therewith in an amount which is effective to absorb incident low energy photon radiation when the dried composition is exposed thereto. Examples of elemental components that may be useful include, but are not limited to, chlorine, bromine, iodine, potassium, rubidium, cesium, barium, tungsten, lead and bismuth.

The thus mixed composition is then applied as a layer onto a substrate or support layer. Examples of substrates or supports that may be used include, but are not limited to, polymeric, metallic, glass, silicon and gallium arsenide. In accordance with a particular embodiment of the invention, the substrate or support layer may be a polymeric film which is permeable to low energy x-rays. The thus coated substrate is then dried at a temperature from about ambient up to about 100° C. but below the distortion temperature of the substrate and below the decomposition temperature of any of the components of the coating or the melting point of the polyacetylene compound therein. The drying operation is generally conducted over a period of from about 20 seconds to about 10 hours and is typically effected at 15° to 60° C. for a period of from about 1 minute to about 5 hours.

The film thus formed is sensitive to radiation and, upon irradiation, a polymerization process is initiated in the polyacetylenic compound resulting in an immediate change in the color of the coating. The color darkens in proportion to the radiation exposure. The degree of darkening may be measured with a number of instruments including densitometers, spectrophotometers and film scanners. Generally when making such measurements, the color change of a transparent film sample would be assessed by measuring the proportion of light transmitted through the sample. Similarly, film coated on an opaque film base would be appropriately examined by measuring the proportion of light reflected from the sample.

Since the film darkens in proportion to radiation exposure, it is possible to measure the darkening and use this measurement as a means for determining the amount of the radiation exposure based on the calibration determined as described herein. Thus, the film may be employed as a radiation dosimeter, to measure and map radiation fields.

The radiation may be any type of ionizing radiation. Preferably the ionizing radiation takes the form of alpha particles, beta particles, x-rays, Gamma rays, short wavelength UV, neutrons or charged particle radiation. These particles or rays may be formed by decaying radioactive atoms, or by accelerated electrons or other charged particles striking a metal target or causing a discharge in a volume of gas. In one embodiment of the present invention the radiation is gamma radiation produced by iridium, preferably iridium-192. In another embodiment of the present invention the radiation is x-ray radiation. X-rays are produced when electrons collide with the atoms and nuclei of a metal target.

Certain aspects of the present invention are described in more detail with respect to the following non-limiting examples of algorithms that can be used to account for variations in thickness of the radiation sensitive layer when measuring dose. Although the examples describe various algorithms that can be used in accordance with the present invention, other algorithms can also be used as recognized by those of ordinary skill in the art to provide the same or similar adjustments and modifications of the scanned images.

Uniformity Correction based on a reference channel:
1. Pixel Value Model
Color channel signal X=R, G, B for each pixel index (i,j) is reverse proportional to some dimensionless measure $\tau$ of the thickness of the active layer $$X(D)=1-[1-X_D(D)]\tau \qquad (1)$$

wherein D stands for the absorbed dose, $X_D$ is a solely dose proportional function describing the sensitivity of the active layer. The [0,1] ranged values of the function X(D) are measured using a film or image scanner. The model equation (1) fulfills the limit case $$\lim_{\tau \to 0} X(D) = 1 \qquad (2)$$

i.e. film is fully transparent for zero thickness.
Having a region of same dose exposure (flat field) and averaging the channel X with respect to the pixel region, i.e.

$$\overline{X}(D) = \frac{1}{N}\sum_{i,j} X(D) = (1-\overline{\tau}) + X_D(D)\overline{\tau}. \qquad (3)$$

The function $X_D$ can be expressed as $$X_D(D) = \frac{\overline{X}(D) - (1-\overline{\tau})}{\overline{\tau}}. \qquad (4)$$

Together with equation (1) one finds that $$\frac{1-X(D)}{1-\overline{X}(D)} = \frac{\tau}{\overline{\tau}} \qquad (5)$$

at any pixel location for each color channel value. The ratio $$\frac{\tau}{\overline{\tau}}$$

is the relative thickness of the active layer and is independent of scaling used for $\tau$. The calibration process allows one to measure $\overline{X}$ at known dose exposure (averaged measurement of same exposure) and correlate a parameterized calibration function which can be used to calculate the dose at a specific pixel by $$D = \overline{X}^{-1}(X) \qquad (6)$$

only under the assumption that the thickness of the active layer is constant. The ratios of the inverted pixel values are proportional to $$\frac{(1-R)}{(1-\overline{R})} = \frac{(1-G)}{(1-\overline{G})} = \frac{(1-B)}{(1-\overline{B})} = \frac{\tau}{\overline{\tau}} \qquad (7)$$

the relative layer thickness. The absorbed dose D at any pixel location can be calculated solving this equation for a pair of color channel values. One obtains $$D = \overline{X}^{-1}\left(1-[1-X]\Big/\frac{\tau}{\overline{\tau}}\right), \qquad (8)$$

and using a second channel $X_{ref}$ to reference the relative thickness $$\frac{\tau}{\overline{\tau}}$$

the above equation yields $$D = \qquad (9)$$
$$\overline{X}^{-1}\left(1-[1-X]\frac{1-\overline{X}_{ref}(D)}{1-\overline{X}_{ref}}\right) = \overline{X}^{-1}\left(1-\frac{(1-X)}{(1-\overline{X}_{ref})}[1-\overline{X}_{ref}(D)]\right).$$

This equation is non-linear with respect to the dose D.
1) If there is no variation of the thickness of the active layer, i.e. $X_{ref}=\overline{X}_{ref}$, one re-obtains equation (6).
2) If the dose dependence of the reference channel is weak, i.e.

$$\overline{X}_{ref}(D) \approx X_{ref}^0 = \text{const}, \qquad (10)$$

the non-linear equation (9) can be simplified to $$D = \overline{X}^{-1}\left(1-\frac{(1-X)}{(1-\overline{X}_{ref})}[1-X_{ref}^0]\right) \qquad (11)$$

which allows explicit calculation of the dose D.
3) Equation (6) can be used to estimate the dose by $D_o = \overline{X}^{-1}(X)$ and simplify equation (9) to the dose explicit equation (12)

$$D = \overline{X}^{-1}\left(1-\frac{(1-X)}{(1-\overline{X}_{ref})}[1-\overline{X}_{ref}(\overline{X}^{-1}(X))]\right). \qquad (12)$$

4) Solving equation (9) at a specific pixel position is equivalent to finding the root of the function $\phi$ with $$\phi(D)=(1-X)(1-\overline{X}_{ref}(D))-(1-X_{ref}(1-\overline{X}(D))) \qquad (13)$$

Equation (6) can be used to obtain an initial value $D_o$ of the dose D.
2. Optical Density Model
Defining optical density as $$d_x = \log(X). \qquad (14)$$

Color channel signal X=R, G, B for each pixel index (i,j) is reverse proportional to some dimensionless measure $\tau$ of the thickness of the active layer $$d_x(D) = d_x^D(D)\tau \qquad (15)$$

wherein D stands for the absorbed dose and $d_x^D$ is a solely dose proportional function describing the sensitivity of the active layer. The function value $d_x(D)$ is measured using a film or image scanner and conversion (14). The model equation (1) fulfills the limit cases $$\lim_{\tau \to 0} X(D) = 1 \quad (16)$$

i.e. film is fully transparent for zero thickness and $$\lim_{\tau \to \infty} X(D) = 0 \quad (17)$$

i.e. film is fully opaque for infinite thickness. Having a region of same dose exposure (flat field) and averaging the channel X with respect to the pixel region, i.e.

$$\bar{d}_X(D) = \frac{1}{N} \sum_{i,j} d_X^D(D)\tau = d_X^D(D)\hat{\tau}, \quad (18)$$

where $\hat{\tau}$ stands for the averaged film thickness with $$\hat{\tau} = \frac{1}{N} \sum_{i,j} \tau. \quad (19)$$

Analogously to equation (8) one finds that $$D = \bar{d}_X^{-1}\left(d_X \frac{\tau}{\hat{\tau}}\right) \quad (20)$$

is fulfilled.
(a) Reference Channel Correction
Using a second channel $X_{ref}$ to reference the relative thickness $$\frac{\tau}{\hat{\tau}}$$

as $$\frac{\tau}{\hat{\tau}} = \frac{\bar{d}_{X_{ref}}(D)}{d_{X_{ref}}} \quad (21)$$

which leads similar to equation (9) to $$D = \bar{d}_X^{-1}\left(\frac{d_X}{d_{X_{ref}}} \bar{d}_{X_{ref}}(D)\right). \quad (22)$$

1. If there is no variation of the thickness of the active layer, i.e. $d_{X_{ref}} = \bar{d}_{X_{ref}}$ one obtains from equation (22)

$$D = \bar{d}_X^{-1}(d_X). \quad (23)$$

which is density equivalent of equation (6).
2. Defining $$\Delta_X^{X_{ref}}(\rho) = \frac{1}{N} \sum_{d_X = \rho d_{X_{ref}}} d_X \quad (24)$$

which averages the density values $d_X$ with $$\frac{d_X}{d_{X_{ref}}} = \rho.$$

For this function the symmetry relation $$\Delta_X^{X_{ref}}(\rho)\rho = \Delta_{X_{ref}}^X\left(\frac{1}{\rho}\right) \quad (25)$$

is fulfilled. One can use as an initial estimate for the dose $$D_0 = \bar{d}_{X_{ref}}^{-1}\left(\Delta_{X_{ref}}^X\left(\frac{d_{X_{ref}}}{d_X}\right)\right) = \bar{d}_{X_{ref}}^{-1}\left(\frac{d_{X_{ref}}}{d_X}\Delta_X^{X_{ref}}\left(\frac{d_X}{d_{X_{ref}}}\right)\right) \quad (26)$$

(second part uses equation (25)) and equation (22) becomes $$D = \bar{d}_X^{-1}\left(\Delta_X^{X_{ref}}\left(\frac{d_X}{d_{X_{ref}}}\right)\right). \quad (27)$$

3. Solving equation (22) at a specific pixel position is equivalent to finding the root of the function $\phi$ with $$\phi(D) = \bar{d}_X(D)d_{X_{ref}} - \bar{d}_{X_{ref}}(D)d_X. \quad (28)$$

Equation (23) can be used to obtain an initial value $D_o$ of the dose D.
(b) Triple Channel Correction
Equations (15) and (18) yield $$\frac{\tau}{\hat{\tau}} = \frac{d_X}{\bar{d}_X} \quad (29)$$

for all X. Using three color channels (wave length) $X_1$, $X_2$ and $X_a$, one obtains from equation (20) for each X a dose value $D_X$. Those dose values differ in general from each other due to overlaid noise and approximative character of the calibration functions of the color channels.

This offset in dose can be minimized with respect to the relative thickness $$\frac{\tau}{\hat{\tau}},$$

i.e. one determines the minimum of the function $\theta$ with $$\theta\left(\frac{\tau}{\hat{\tau}}\right) = \sum_{i \neq j} (D_{X_i} - D_{X_j})^2 \to \min_{\tau/\hat{\tau}} \quad (30)$$

by finding the roots of $$\frac{\partial}{\partial \frac{\tau}{\hat{\tau}}} \theta\left(\frac{\tau}{\hat{\tau}}\right) = 0 \qquad (31)$$

Certain aspects of the present invention are described in more detail with respect to the following non-limiting examples.

Example 1

A coating composition was prepared by mixing the following components:
Polyvinyl alcohol (25% in water): 45 parts by weight
Lithium salt of pentacosadiynoic acid (18% in water): 50 parts by weight
Water: 1.915 parts by weight
Surfactant 10G (10% in water): 0.958 parts by weight The composition described was coated on a transparent polyester substrate. The fluid was metered onto the substrate through a slot die applicator to produce a coating with a nominal wet thickness of 0.005." The wet coating was run through a forced hot-air dryer yielding a dry coating with a thickness of approximately 28 microns. The coating was almost colorless.

Example 2

A coating composition was prepared by mixing the following components:
Polyvinyl alcohol (25% in water): 45 parts by weight
Lithium salt of pentacosadiynoic acid (18% in water): 50 parts by weight
Tartrazine (15% in water) 1.915 parts by weight
Surfactant 10G (10% in water): 0.958 parts by weight The composition above was coated on a transparent polyester substrate. The fluid was metered onto the substrate through a slot die applicator to produce a coating with a nominal wet thickness of 0.005." The wet coating was run through a forced hot-air dryer yielding a dry coating with a thickness of approximately 28 microns. The coating was yellow in color.

Example 3

A piece of the coating of Example 1 was placed in a spectrophotometer and the absorption spectrum was recorded between wavelengths of 350 nm and 800 nm. There were no absorption peaks in the spectrum. The absorbance values changed almost linearly from a value of about 0.04 at 800 nm to a value of about 0.18 at 350 nm.

Example 4

A piece of the coating of Example 2 was placed in a spectrophotometer and the absorption spectrum was recorded between wavelengths of 350 nm and 800 nm. The spectrum showed a peak absorbance value approaching 2.0 at a wavelength about 420nm. The absorbance fell to a value of about 0.12 at wavelengths greater than 510 nm, The absorption band with its peak at about 420 nm results from the presence of tartrazine in the coating.

Between the wavelengths of about 510 mn and 800 nm the spectral absorbance of the coating of Example 2 is almost indistinguishable from the spectral absorbance of the coating of Example 1.

These observations establish that the tartrazine dye produces strong spectral absorbance in the blue portion of the spectrum below about 500 nm, but has essentially no absorbance in the red part of the spectrum above 600 nm.

Example 5

A piece of the coating of Example 1 was exposed to x-radiation at an absorbed dose of about 2Gy. After irradiation the sample was a blue color. The exposed film was placed in a spectrophotometer and the absorption spectrum was recorded between wavelengths of 350 nm and 800 nm. Major and minor absorbance peaks were present at wavelengths of 635 nm and 585 nm respectively. There were two shoulders on the lower wavelength side of the minor absorbance peak and there was a prominent tail extending down to 350 nm.

These observations establish that the radiation sensitive component in the film produces the strongest response in to red portion of the spectrum >600 nm and responds less strongly in the green portion of the spectrum from 500-600 nm. The observations also establish that the radiation sensitive component produces the least response in the blue portion of the spectrum <500 nm.

Example 6

A piece of the coating of Example 2 was exposed to x-radiation at an absorbed dose of about 2Gy. After irradiation the sample was a green color. The exposed film was placed in a spectrophotometer and the absorption spectrum was recorded between wavelengths of 350 nm and 800 nm. Major and minor absorbance peaks were present at wavelengths of 635 nm and 585 nm respectively. There was one shoulder on the lower wavelength side of the minor absorbance peak and a major absorbance peak at approximately 420 nm.

Comparing the spectrum of the sample of this Example with the sample from Example 5 it was observed that the total absorbance at the major and minor peaks was virtually the same in the two samples. This establishes that the tartrazine dye has an insignificant effect on the absorbance of the active component in the red portion of the spectrum >600 nm.

Comparing the spectrum of the sample of this Example with the spectrum of the sample of Example 4 at wavelengths <500 nm it was observed that the absorbance values of the exposed sample were about 5%-10% greater than the unexposed sample, This establishes that the response of the film in the blue portion of the spectrum is principally due to the tartrazine dye, but that there is a significant component to the absorbance resulting from exposure of the active component.

Overall the observations establish that the response in the blue portion of the spectrum is dependent on the exposure of the active component in the film, but the response in the red portion of the spectrmn is independent of the tartrazine dye.

Example 7

A coating composition was prepared by mixing the following components:
Polyvinyl alcohol (25% in water): 57 parts by weight
Water: 38 parts by weight
Tartrazine (15% in water) 1.915 parts by weight
Surfactant 10G (10% in water): 0.958 parts by weight The composition above was coated on a transparent polyester substrate. The fluid was metered onto the substrate through a slot die applicator to produce a coating with a nominal wet thickness of 0.05." The wet coating was run through a forced hot-air dryer yielding a dry coating with a thickness of approximately 19 microns. The coating was yellow in color.

A piece of the coating was placed in a spectrophotometer and the absorption spectrum was recorded between wavelengths of 350 nm and 800 nm. The spectrum showed a peak absorbance value approaching 2.0 at a wavelength about 420 nm.

The sample was then exposed to x-radiation at an absorbed dose of about 50Gy. There was no observable change in color due to the radiation exposure. The exposed film was placed in a spectrophotometer and the absorption spectrum was recorded between wavelengths of 350 nm and 800 nm. The absorption spectra were identical before and after exposure. This establishes that the tartrazine dye is impervious to the effects of radiation exposure at absorbed doses up to 50Gy.

Example 8

An 8"×10" piece of the coated film described in Example 2 was placed on an Epson 10000XL film scanner fitted with a transparency adapter. Two control films approximately 2"×2" in size and composed of transparent yellow and transparent blue filter materials were attached to the bed of the scanner. Their locations were separate from the 8"×10" film. This larger film was placed in such a way on the scanner that it could be removed and replaced with within 0.5mm of the original position.

The scanner was connected to a computer and controlled through the use of Epson Scan software interface. In this software application all options for color correction were turned off. This permits acquisition of raw response values from the scanner without application of any type of image correction algorithm.

An RGB image was collected of the 8"×10" film and control films at a spatial resolution of 50 dpi. This RGB image was split into its red, green and blue component parts. The blue component image was displayed on a computer monitor. It was observed that the image was not of uniform darkness. This indicates that the thickness of the coating on the sample film was not uniform.

The film was placed on a light table and visually inspected. This revealed that the yellow color of the film was not perfectly uniform and that there were areas with optical density that was slightly more than average and other areas with optical density slightly less than average. By careful comparison it appeared that the pattern of lightness and darkness visually observable on the film corresponded with the pattern in the blue component image displayed on the computer monitor.

Example 9

The 8"×10" film of Example 8 was exposed to a uniform field of 6MV x-radiation produced by a linear accelerator. The absorbed dose was approximately 2 Gy. After exposure the film had turned a green color. Careful inspection of the exposed film on a light table showed that the appearance of the film was not perfectly uniform, Some areas had an optical density that was slightly more than average and some had an optical density slightly less than average. By careful comparison it appeared that the pattern of lightness and darkness visually observable on the exposed film corresponded with the pattern in the blue component image of Example 8 displayed on a computer monitor, The exposed film was placed back on the Epson 10000XL scanner in registration with the original placement described in Example 8. The two control films were still on the scanner and had not been moved. An RGB image was collected of the exposed 8"×10" film and the control films at a spatial resolution of 50 dpi. The image was split into its red, green and blue component parts.

Example 10

The images of the unexposed and exposed films of Examples 8 and 9 were measured using MIRA AP6 image analysis software. One feature of this software permits the measurement of the scanner response values within user defined areas of interest within the red, green and blue component parts, or channels, of an RGB image.

In this manner the blue channel image of the unexposed 8"×10" film (Example 8) was measured. The area of interest was approximately 7.5"×9.5" centered on the film. The mean response value, $M_{U,B}$, was measured. A correction image, $IC_{U,B}$ was then generated by normalizing all the pixel values in the original blue channel image with respect to the value $M_{U,B}$. This operation was performed using the image arithmetic function in the MIRA AP6 software to divide the scanner response value of each individual pixel by $M_{U,B}$. The correction image contains information about the thickness differences in the 8"×10" film. If the film was perfectly uniform all the pixels in the image would have a value of 1, but the presence of small thickness differences cause the values to be slightly greater than 1 or slightly less than 1 depending on whether the coating at that position is slightly thicker or thinner than average.

The red channel component image of the exposed 8" x 10" film of Example 9 was examined. Thus the MIRA AP6 software was used to display profiles of scanner response values within selected areas of interest. Profiles were obtained across areas of the image where non-uniformities were evident from the display on the monitor. From these profiles it could be seen that the scanner response values varied by up to at least ±3%. Of course, even in a perfectly uniform film, the response values would not be all exactly 1.000. Thus, there is an error in pixel value measurement caused by noise sources within the scanner itself. Although these noise contributions are relatively small at about 0.25%-0.5%, noise reduction is recommended due to noise compounding. Differences in thickness in a film are at low spatial frequency e.g., less than 0.3 cycles/mm, while there is significant signal noise from the detector elements in the CCD array. However, scans are typically conducted at a resolution of at least 0.3 mm, so the frequency of the scanner noise appears at greater than 3 cycles/mm. Since the scanner noise and film thickness variations are in significantly different frequency domains, the effects of scanner noise can be effectively filtered out of the relative thickness map.

A correction was then applied to the red channel image of the exposed film. The image arithmetic function of the MIRA AP6 software was employed to divide the red channel image of the exposed film by the correction image $IC_{U,B}$. In this manner the response value of each pixel in the red channel image of the exposed film was divided by the value of the corresponding pixel in the correction image. Since the response values in the correction image vary according to differences in thickness, the image division operation flattened the red channel image of the exposed film, producing an image in which the response values were independent of thickness.

The MIRA AP6 software was used to display profiles of scanner response values within selected areas of interest of the flattened red channel image. Profiles were obtained across areas of the flattened image and compared to profiles across the same areas of the image before flattening. It was observed that whereas the scanner response values varied by up to at least ±3% before flattening, the values after flattening varied by less than ±1%. This demonstrates that incorporation of a dye in the film can provide a means by which to correct the response of a radiation sensitive film for differences in thickness.

Example 11

Correction using the Response of a Single Reference Channel

The benefit demonstrated in Example 10 notwithstanding, it is very inconvenient for a user to have to scan each film before and after exposure and to place the films accurately on the scanner so that the positions are in perfect registration. Also it is inconvenient to use the MIRA AP6 software and other commercially available image analysis software to perform the various arithmetical operations described in the previous example. Furthermore, none of the commercially available software will permit measurement and analysis of RGB color images of a film containing a marker dye so that those images can be corrected for response differences caused by variation in the thickness of the radiation sensitive component. The description that follows defines a procedure that may be employed where films are used for radiation dosimetry. The procedure describes the use of specialized computer software, FilmQA Pro, to measure and analyze RGB color images and perform the mathematic and arithmetic operations described above under the heading "Uniformity Correction Based on a Single Reference Channel." The operations provided are central to the current invention. A particular advantage of the method described is that each film is only scanned a single time. This particular Example uses a correction method based on response values measured in the color channel where the signal from the marker dye is greatest. The marker dye in this Example is tartrazine, a yellow dye having its greatest response in the blue color channel. The radiation sensitive component in this Example is the lithium salt of pentacosa-10,12-diynoic acid. After exposure to radiation the lithium salt of pentacosa-10,12-diynoic acid forms a blue colored polymer having its greatest response in the red color channel.

In the process of film dosimetry for radiation dose measurement it is common to employ a calibration film. This is one or more films, upon which a set of calibrated radiation doses have been exposed. This single film, or set of films, is referred to as the calibration film. In the process of film dosimetry it is also common to have exposed a film, or films, to a radiation field for the purpose of determining the radiation doses delivered over a two-dimensional plane within the radiation field. This film, or set of films, is referred to as the measurement film.

The process for applying corrections to compensate for differences in thickness of the measurement film is described as follows.

In this example the measurement film, M, was the 8"×10" film described in Example 9. The calibration film, C, was a film from the same lot number as the measurement film upon which a number of defined areas had received known doses of radiation. Both films were scanned in RGB transmission mode at 75 dpi on an Epson 10000XL film scanner fitted with a transparency adapter. The FilmQA Pro software was used to measure the scanner response values in the red and blue channels within the exposed areas of the RGB images obtained by scanning the calibration film. The FilmQA Pro software was used to plot the measured red and blue response values from the calibration film vs. radiation dose thereby providing calibration curves for the red and blue color channels. The relationship between the values in the calibration curves was expressed mathematically by using a rational linear fitting function. A fitting function expresses one variable as the function of another variable. It is useful to employ an invertible fitting function because the constants in the function can be rearranged using simple arithmetic operations to express variable A as a function of variable B or vice versa. Other examples of invertible functions are exponential linear or reciprocal linear functions. Polynomial functions can also be used to generate calibration curves relating response to dose, but are less desirable because they cannot be inverted.

Figure 2:
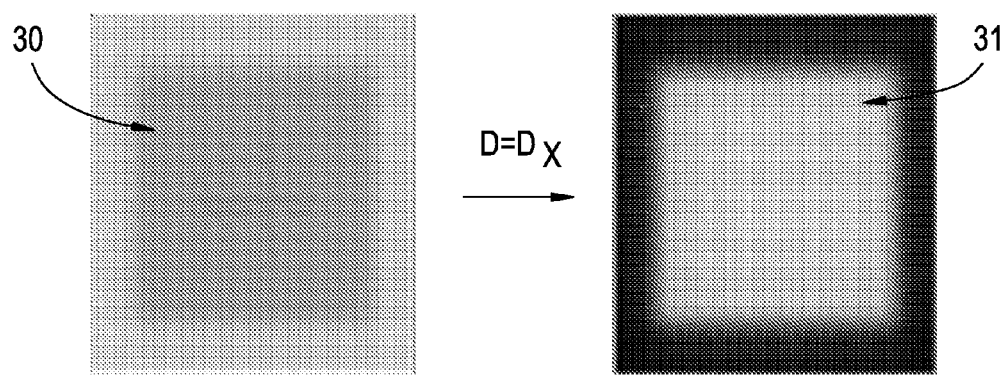
FIG. 2 is an image of film after radiation exposure and dose map calculated from response in the red color channel.
Figure 3:
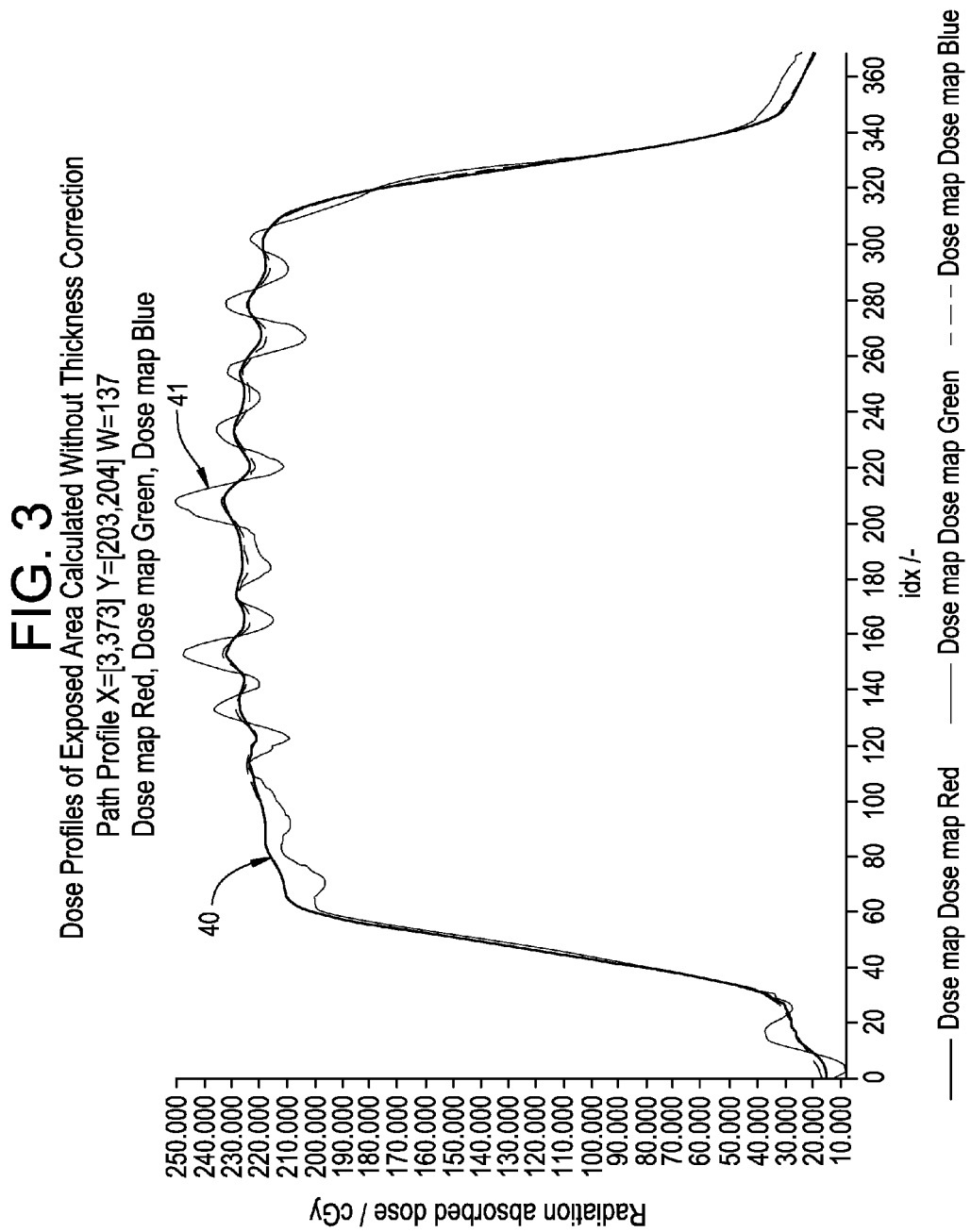
FIG. 3 is a graph depicting dose profiles of exposed area calculated without thickness correction.

The RGB image of the measurement film was provided as input to the FilmQA Pro software. The software was then used to apply the calibration functions for the red and blue color channels to convert the measurement image from scanner value space to dose value space. The image of the measurement film is displayed at 30 in FIG. 2 and the dose map image derived from the red color channel is displayed at 31. The dose profiles calculated from the red and blue color channels in the horizontal direction across the dose map are displayed at 40 and 41 respectively in FIG. 3. This shows that the dose profile in both the red and blue color channels are substantially non-uniform. The non-uniformity appears larger in the blue color channel because the response in this color channel is strongly dependent on thickness, but only weakly dependent on radiation dose whereas the opposite is true of the red color channel. The example shown at 40 displays deviations up to about 10cGy in dose across the calculated dose profile and is representative of a dose map calculated without correction for thickness abnormalities.

Figure 4:
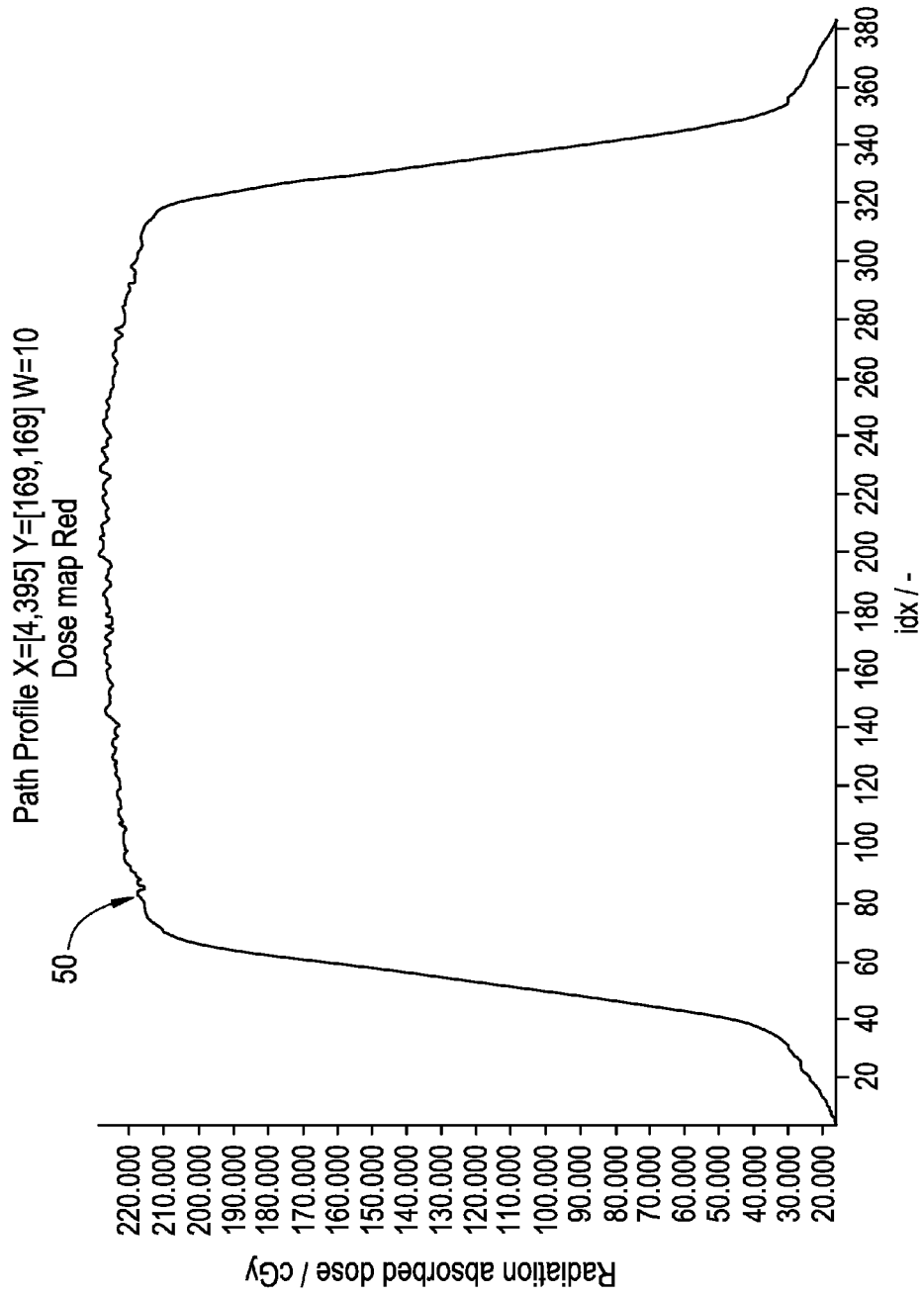
FIG. 4 is a graph depicting profile of response calculated from the red color channel corrected for thickness abnormalities.

The FilmQA Pro software was also employed to split the dose response into two parts representing the dose-dependent and dose-independent portions. In this particular example the calculations are done using the dose responses from two channels—a measurement channel, in this instance the red color channel and a reference channel, in this instance the blue color channel. The dose-independent portion is indicative of thickness differences in the radiation sensitive component of the film. The FilmQA Pro software then applied the dose-independent portion of the image to adjust the dose response of the measurement film for thickness differences and to calculate a corrected two-dimensional dose image, or dose map, from the measurement film. The dose profile across the dose map calculated from the response in the red color channel and corrected for thickness abnormalities is shown at 50 in FIG. 4. By comparing the profile shown at 50 in FIG. 4 with the profile at 40 in FIG. 3 it is apparent that the correction for the effect of abnormalities in the thickness of the radiation sensitive component in the active layer has almost eliminated the dose variations across the exposed area.

Example 12

The benefit demonstrated in Example 11 notwithstanding, it is recognized that exposure of the radiation sensitive component in the described film produces a significant change in response of the green color channel in addition to the change in the red color channel. It is advantageous to use this response in addition to the responses in the red and blue color channels in calculating doses in the measurement film. Using this additional data can serve to reduce noise in the dose image due to random fluctuations in the response of the elements of the CCD array in the scanner. The description that follows provides an example of a procedure that may be employed where films are used for radiation dosimetry. The procedure describes the use of specialized computer software, FilmQA Pro, to measure and analyze RGB color images and perform the mathematic and arithmetic operations described above under the heading "Triple Channel Correction." The operations provided are central to certain aspects of the current invention. A particular advantage of the method described is that each film is only scanned a single time. This particular Example uses a correction method based on response values measured in all three color channels of an RGB scanner including the color channel where the signal from the marker dye is greatest. The marker dye in this Example is tartrazine, a yellow dye having its greatest response in the blue color channel. The radiation sensitive component in this Example is the lithium salt of pentacosa-10,12-diynoic acid. After exposure to radiation the lithium salt of pentacosa-10,12-diynoic acid forms a blue colored polymer having its greatest response in the red color channel and a lesser response in the green color channel.

In the process of film dosimetry for radiation dose measurement it is common to employ a calibration film. This is one or more films, upon which a set of calibrated radiation doses have been exposed. This single film, or set of films, is referred to as the calibration film. In the process of film dosimetry it is also common to have exposed a film, or films, to a radiation field for the purpose of determining the radiation doses delivered over a two-dimensional plane within the radiation field. This film, or set of films, is referred to as the measurement film.

The process for applying corrections to compensate for differences in thickness of the measurement film is described as follows.

In this example the measurement film, M, was the 8"×10" film described in Example 9. The calibration film, C, was a film from the same lot number as the measurement film upon which a number of defined areas had received known doses of radiation. Both films were scanned in RGB transmission mode at 75 dpi on an Epson 10000XL film scanner fitted with a transparency adapter. The FilmQA Pro software was used to measure the scanner response values in the red, green and blue channels within the exposed areas of the RGB images obtained by scanning the calibration film. The FilmQA Pro software was used to plot the measured red, green and blue response values from the calibration film vs. radiation dose. This provided calibration curves for all three color channels. The relationship between the values in each of the calibration curves was expressed mathematically by using a rational linear fitting function. A fitting function expresses one variable as the function of another variable. It is useful to employ an invertible fitting function because the constants in the function can be rearranged using simple arithmetic operations to express variable A as a function of variable B or vice versa. Other examples of invertible functions are exponential linear or reciprocal linear functions, Polynomial functions can also be used to generate calibration curves relating response to dose, but are less desirable because they cannot be inverted.

Figure 5:
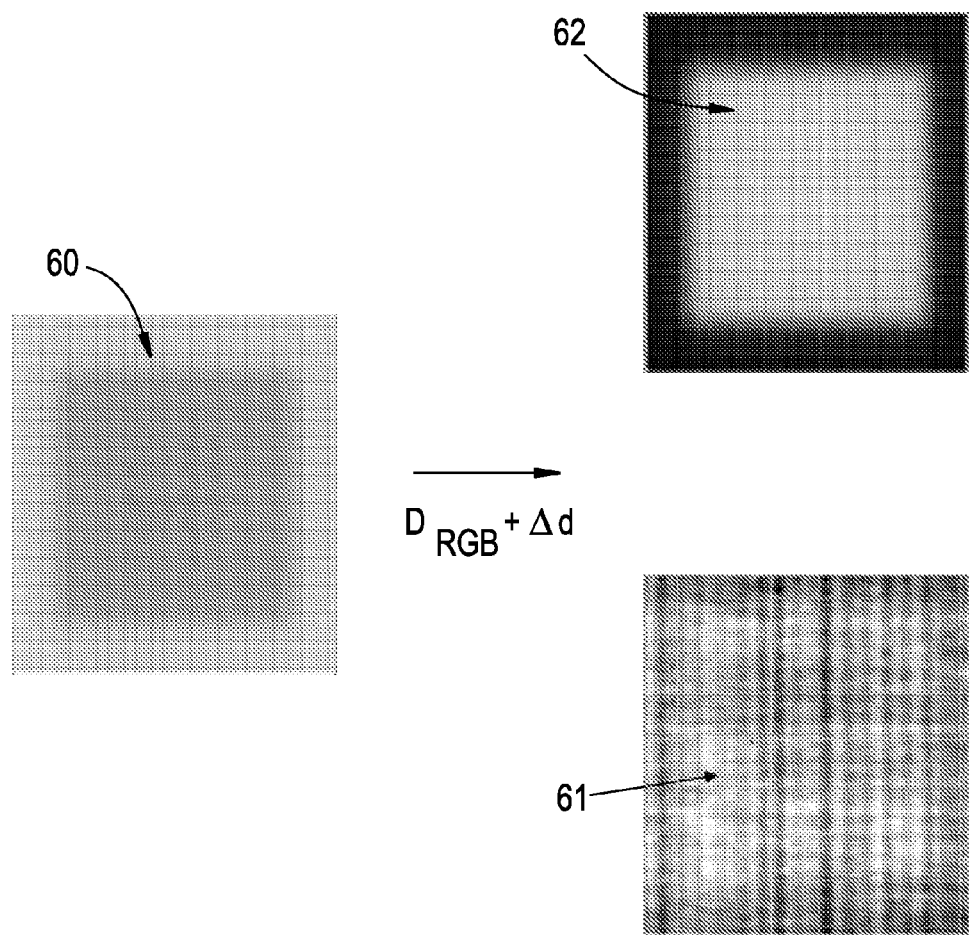
FIG. 5 illustrates dose-independent and dose-dependent portions of a measured image using the triple channel correction method.
Figure 6:
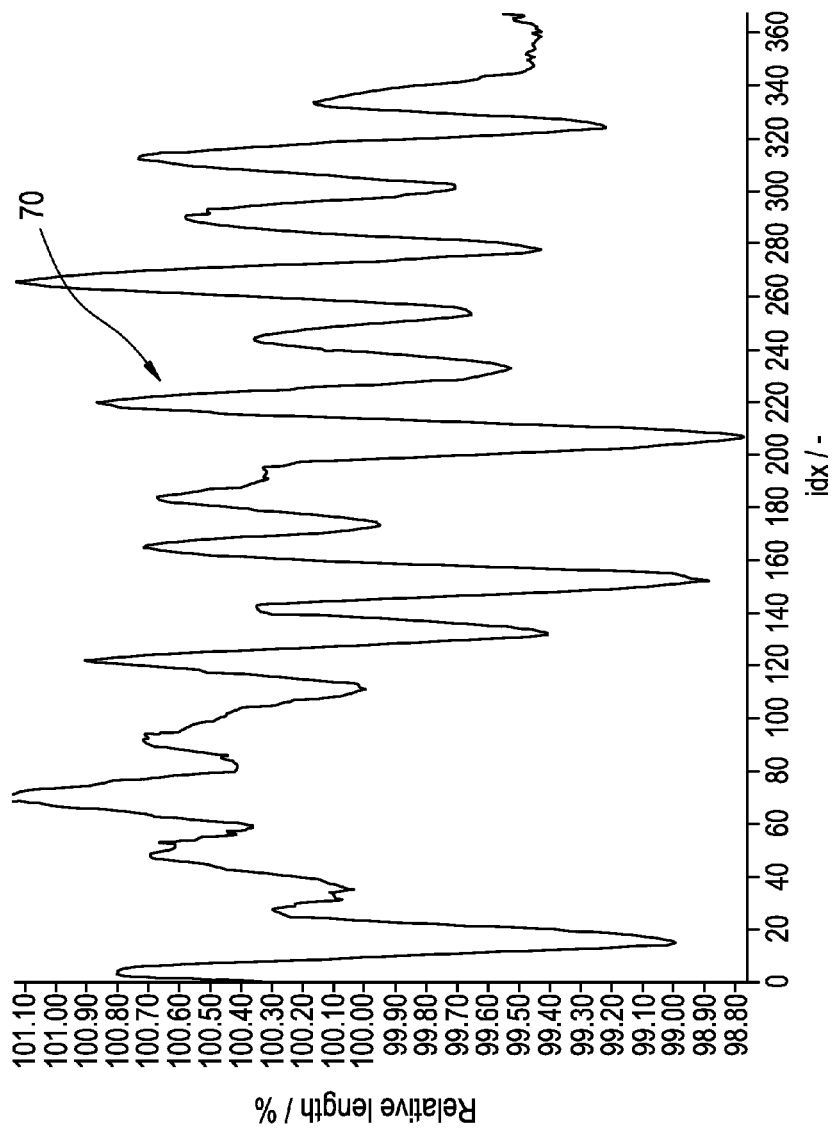
FIG. 6 is a profile across the dose-independent image portion derived using the triple channel correction method.

The RGB image of the measurement film was provided input to the FilmQA Pro software. The software was then used to apply the calibration functions for the red, green and blue color channels to convert the measurement image from scanner value space to dose value space. As part of this operation the software split the dose response into two parts representing the dose-dependent and dose-independent portions. The images representing the dose-independent and dose-dependent portions are displayed at 62 and 61 respectively in FIG. 5. The image of the measurement film from which the dose calculations are made is displayed at 60. A profile across the dose-independent portion of the image is displayed at 70 in FIG. 6. The variations across the profile are indicative of differences in the thickness of the active component in the active layer of the film. The FilmQA Pro software applies the dose-independent portion of the image to adjust the dose response of the measurement film for thickness differences. The dose-dependent image thus calculated is a two-dimensional dose image, or dose map, of the measurement film corrected to eliminate the effects of abnormalities in the thickness of the radiation sensitive component in the active layer. Displayed at 80 in FIG. 7 are the dose profiles for the red green and blue color channels across the exposed area of the measurement film calculated using this triple channel method for correcting thickness abnormalities. It is to be noted that the dose values for the three channels are almost inseparable because the software computes a solution whereby the dose differences between the color channels are minimized. Comparing the dose profile displayed at 80 in FIG. 7 with the dose profile displayed at 40 and 41 in FIG. 3 it is apparent that the dose profile of the provided by the triple channel correction is substantially uniform and the effects of thickness differences of the active component are virtually eliminated.

It is to be understood that the computer readable program code can be conventionally programmed using any of a wide range of suitable computer readable programming languages that are now known in the art or that may be developed in the future. It is also to be understood that the computer readable program code can include one or more functions, routines, subfunctions, and subroutines, and need not be combined in a single software package.

It is contemplated that the inventive concepts herein described may be variously otherwise embodied and it is intended that the appended claims be construed to include alternative embodiments of the invention except insofar as limited by the prior art.

What is claimed is:

1. A radiation dosimetry method comprising:
(a) providing a radiation dosimetry calibration film comprising a substrate and a layer of radiation-sensitive material disposed on said substrate wherein said radiation-sensitive material comprises a radiation-sensitive active component and a radiation-impervious material;
(b) exposing discrete areas of said radiation dosimetry calibration film to known doses of radiation;
(c) scanning said exposed radiation dosimetry calibration film in a plurality of color response channels to generate a digital image, $I_C$; with responses in a plurality of component color channels;
(d) measuring said digital image $I_C$ to determine the scanner response values of the exposed areas in each component color channel;
(e) determining dosimetry film calibration curves for each component color channel by plotting said scanner response values in each component color channel versus the corresponding dose values and fitting the data to a mathematical function expressing the dose values as a function of the scanner response values;
(f) providing a radiation dosimetry measurement film comprising a substrate and a layer of radiation-sensitive material disposed on said substrate wherein said radiation-sensitive material comprises a radiation-sensitive active component and a radiation-impervious material;
scanning the radiation dosimetry measurement film in a plurality of color response channels, said measurement film comprised of areas exposed to a pattern of radiation dose to generate a digital image, $I_M$; with responses in a plurality of component color channels;

(g) applying said dosimetry film calibration curves to divide the responses at each location and each component color channel comprising the digital image of the measurement film into a dose dependent portion comprising a plurality of dose dependent values that are dependent on radiation dose and a dose independent portion comprising a plurality of dose independent values that are independent of radiation dose using a plurality of calibration curves so that the differences between the radiation dose values in the component color channels are minimized;

(h) using said dose dependent values and said dose independent values to generate a dose map and relative thickness map of said radiation dosimetry measurement film;

(i) using said dose dependent values and said dose independent values to generate a map of the signal noise contained in said dose map of said radiation dosimetry measurement film;

(j) determining a correction function to remove said signal noise from said dose map of the radiation dosimetry measurement film; and (k) applying said correction function to provide a corrected dose map which accounts for variations in thickness of the layer of radiation sensitive material.

2. The method of claim 1 wherein the digital image comprises an RGB digital image.

3. The method of claim 2 wherein said correction function involves RGB multi-channel uniformity correction.

4. The method of claim 1 wherein said correction function comprises a triple channel correction.

5. The method of claim 1 wherein said calibration curves are generated using invertible fitting functions.

6. The method of claim 1 wherein said radiation-impervious material comprises a dye.

7. The method of claim 6 wherein said dye comprises a tartrazine dye.

8. The method of claim 1 wherein said radiation-sensitive active component comprises a substantially crystalline image receptive polyacetylenic compound having the structure:

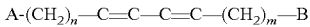

wherein m and n are both independently an integer from 6 to 14 and A and B are independent from one another and are selected from the group consisting of methyl, carboxyl, hydroxy, amido, lower alkyl substituted amido, aliphatic or aromatic carboxylate ester group having up to 10 carbon atoms, mono- or di-valent carboxylate metal salt group, halo, carbamyl, lower alkyl substituted carbamyl or tosyl, triyn or tetrayne products of the above polyacetylenes having from 20 to 60 carbon atoms and a conjugated structure, and combinations thereof.

9. The method of claim 1 wherein said radiation-sensitive active component comprises pentacosadiynoic acid or salts thereof.

10. The method of claim 1 wherein said plurality of known radiation dose levels comprises from about 3 to about 25 different dose levels.

11. The method of claim 1 wherein said known radiation dose levels fall within the range of from about 1 cGy to about 100000Gy.

12. A radiation dosimetry method comprising:
(a) scanning a radiation dosimetry calibration film which has been exposed in discrete areas to a plurality of different radiation doses to generate a digital image, $I_C$;
(b) scanning a radiation dosimetry measurement film which has been exposed to a dose of radiation to generate a digital image, $I_M$;
(c) wherein each of said radiation dosimetry calibration film and said radiation dosimetry measurement film comprises a substrate and a layer of radiation-sensitive material disposed on said substrate wherein said radiation-sensitive material comprises a radiation-sensitive active component and a radiation-impervious material;
(d) wherein exposure of the radiation-sensitive active component produces a colored compound that provides response values that are dependent on dose and the radiation-impervious material provides response values that are substantially independent of dose; and
(e) adjusting the digital image to account for variations present in the image based on the response values independent of dose to provide a corrected image.

13. The method of claim 12 further comprising converting the corrected image to an image representing dose by applying a calibration function based on the relationship between absorbed dose and response values.

14. The method of claim 12 wherein the digital image comprises an RGB digital image.

15. The method of claim 12 wherein said radiation-sensitive active component comprises a substantially crystalline image receptive polyacetylenic compound having the structure:

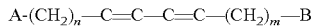

wherein m and n are both independently an integer from 6 to 14 and A and B are independent from one another and are selected from the group consisting of methyl, carboxyl, hydroxy, amido, lower alkyl substituted amido, aliphatic or aromatic carboxylate ester group having up to 10 carbon atoms, mono- or di-valent carboxylate metal salt group, halo, carbamyl, lower alkyl substituted carbamyl or tosyl, triyn or tetrayne products of the above polyacetylenes having from 20 to 60 carbon atoms and a conjugated structure, and combinations thereof.

16. The method of claim 15 wherein said radiation-sensitive active component comprises pentacosadiynoic acid or salts thereof.

17. The method of claim 12 wherein the radiation-impervious material is a dye.

18. The method of claim 17 wherein the dye is selected from the group consisting of tartrazine, eosin, quinoline yellow, metanil yellow and combinations thereof.

* * * * *